United States Patent [19]
Choy et al.

[11] Patent Number: 5,758,118
[45] Date of Patent: May 26, 1998

[54] METHODS AND DATA STORAGE DEVICES FOR RAID EXPANSION BY ON-LINE ADDITION OF NEW DASDS

[75] Inventors: David Mun-Hien Choy, Los Altos; Jaishankar Moothedath Menon, San Jose, both of Calif.

[73] Assignee: International Business Machines Corporation, Armonk, N.Y.

[21] Appl. No.: 569,932

[22] Filed: Dec. 8, 1995

[51] Int. Cl.[6] .......................... G06F 12/00; G06F 11/20
[52] U.S. Cl. ............... 395/441; 395/182.05; 395/497.01
[58] Field of Search .......................... 395/441, 182.04, 395/497.01, 182.03, 182.05

[56] References Cited

U.S. PATENT DOCUMENTS

| | | | |
|---|---|---|---|
| 5,390,327 | 2/1995 | Lubbers et al. | 395/182.05 |
| 5,502,836 | 3/1996 | Hale et al. | 395/497.01 |
| 5,522,031 | 5/1996 | Ellis et al. | 395/182.04 |
| 5,524,204 | 6/1996 | Verdoorn, Jr. | 395/182.04 |
| 5,574,851 | 11/1996 | Rathunde | 395/182.05 |
| 5,615,352 | 3/1997 | Jacobson et al. | 395/441 |

OTHER PUBLICATIONS

Paterson et al., "A Case for Redundant Arrays of Inexpensive Disks (RAID)", Proceedings of the 1988 ACM SIGMOND Conference on Management of Data, Chicago, IL., Jun. 1988.

The RAIDbook: A Source Book for Disk Array Technology (Fourth Edition, 1994), published by the RAID Advisory Board of St. Peter, MN, Aug. 8, 1994.

Primary Examiner—Glenn Gossage
Attorney, Agent, or Firm—Baker, Maxham, Jester & Meador

[57] ABSTRACT

An efficient method for adding one or more new direct access storage devices (DASDs) to a redundant array of independent disks (RAID) array without disrupting ongoing operation of the array. In one embodiment, after contents of new DASDs are initialized off-line, the "parity" or "data" status of specific storage locations in the array is re-mapped, without any changes to the storage locations' contents. In a second embodiment, RAID arrays are efficiently expanded and parallelism is facilitated for original as well as new data by re-mapping parity and data tracks, changing the contents of a minimum number of tracks and maintaining the contents of others.

58 Claims, 7 Drawing Sheets

METHODS AND DATA STORAGE DEVICES FOR RAID EXPANSION BY ON-LINE ADDITION OF NEW DASDS

BACKGROUND OF THE INVENTION

1. Field of the Invention

The present invention concerns an efficient method for adding one or more new DASDs to a direct access storage device (DASD) array without disrupting ongoing operation of the array. Specifically, the method operates by initializing the new DASD's contents and re-designating the "parity" and "data" status of specific storage locations in the array while minimizing any changes to the DASDs' contents.

2. Description of the Related Art

To improve the storage capabilities of computers, engineers have developed a number of different advanced data storage systems. The redundant array of inexpensive disks (RAID) configuration is one example. In a general sense, RAID technology stores digital data by employing a multiplicity of DASDs. A typical RAID apparatus includes a RAID controller and a multiplicity of DASDs. Each DASD may in turn include multiple data storage disks along with certain electronics such as a microprocessor and various memory buffers.

The concept of RAID technology is well known, and many different variations of RAID devices have been developed. Some well known RAID architectures include the RAID-1, RAID-2, RAID-3, RAID-4, and RAID-5 arrangements. In the RAID-5 architecture, efficiency and reliability of RAID operations is increased by designating a logical "parity" disk. Physically, parity is actually spread among the disks so that no one disk contains all the parity. As an example, RAID-5 may employ seven data disks, and one parity disk. If a disk fails in this arrangement, the parity disk may be used to reconstruct lost data using a Boolean function such as exclusive-or ("XOR"). The reconstructed data can be stored on a spare disk or a replacement disk.

The following references provide a deeper discussion of RAID technology: "A Case for Redundant Arrays of Inexpensive Disks (RAID)", Report No. UCB/CSD 87/391, December 1987 (also cited as Paterson et al., "A Case for Redundant Arrays of Inexpensive Disks (RAID)," Proceedings of the 1988 ACM SIGMOD Conference on Management of Data, Chicago, Ill., June 1988). Reference is also directed to *The RAIDbook: A Source Book for Disk Array Technology* (Fourth Edition, 1994), published by the RAID Advisory Board of St. Peter, Minn. An example of a RAID-5 system is the IBM model 3514 High Availability External Disk Array.

To conveniently discuss the storage of data in RAID arrays, they are typically represented in tabular form. As an example, FIG. 1 depicts a RAID array 100 with multiple rows 102 and columns 104. Each column represents a different DASD. The rows under a column represent storage tracks for the specific DASD. Each row in the table represents the corresponding tracks from all the DASDs in the RAID system. One of the chief advantages of RAID systems is that data can be stored by striping the data across multiple DASDs, thereby increasing the parallelism in accessing the data, and decreasing the vulnerability of the data to failure of a single DASD. For simplicity, a storage track is used as the striping unit. As discussed below, however, this invention is applicable to any striping size, such as one or more sectors, tracks or cylinders.

For ease of explanation, RAID-5 systems are often described as having a particular DASD that is dedicated for the storage of parity information. In practice, however, certain tracks of each DASD are allocated to store parity bits for the corresponding tracks from other DASDs. This is because parity tracks usually experience a higher workload than data tracks because they must be read and re-written whenever any of the corresponding data tracks are written. Therefore, to balance the workload among the DASDs, the parity tracks are often distributed evenly. In FIG. 1, one track of each row contains parity information, and the remaining tracks contain data. The row 106, for example, contains data in the tracks 108 and parity in the track 110. In an actual RAID-5 implementation, the data tracks and parity track that make up a logical "row" do not have to have the same corresponding physical positions on the DASDs.

The parity track of a row is generated by applying the XOR function to the data of that row. In the case of the row 106, the parity track 110 is generated by calculating the XOR of the data tracks 108. Therefore, if one DASD fails, the lost data of a track can be reconstructed by applying the XOR function to data from the remaining DASDs and the corresponding parity track.

A number of schemes exist for allocating the storage tracks of a RAID array between "data" and "parity" functions. With known systems, these allocations are made by implementing mapping instructions when the RAID array is first initialized, i.e. prior to storing any data or parity information. Then, each time the RAID array receives data for storage, the RAID controller uses the mapping instructions to store the data. More particularly, each item of data is received along with a logical storage address for storing the data within the RAID system (e.g. a logical track number). The controller maps the logical storage address into an actual storage address (e.g. a DASD number and a physical track number within the DASD), stores the data at this location, calculates the appropriate parity bits, and stores the parity bits at a location also designated by the mapping instructions.

As mentioned above, one primary goal is to evenly distribute the parity tracks among the DASDs to balance their workloads. One approach uses a "round-robin" distribution, as shown in FIG. 1. With this approach the tracks and DASDs are initially numbered, and designated parity devices are identified by sequentially incrementing the DASD number along with the track number.

Many users have implemented pre-initialization mapping systems, such as those described above, with adequate results. However, these systems may not meet some user expectations in some situations. One such situation occurs when the user adds new DASDs to a RAID array to increase the system's storage capacity or to increase parallelism among the DASDs. To maintain even distribution of parity, it is desirable to re-allocate some of the parity tracks to the new DASDs. Normally, this is accomplished by implementing a new set of mapping instructions for the expanded array.

Unfortunately, to support this new mapping almost all the data stored on the array must be moved to new storage locations, or alternatively, all the data are unloaded (e.g. to tape media) and then reloaded into appropriate positions of the expanded array. For operations where data availability is critical, two copies of the data may need to be created. With disks exceeding one gigabyte in storage capacity, such unload and reload operations may involve multiple gigabytes. Also, the checkpoint/restart facilities must be carefully handled for this long array-reorganization process, since the occurrence of any errors would further prolong and complicate the process. Thus, adding a DASD to a RAID array consumes a significant amount of computing resources and also temporarily inhibits the system's data availability.

SUMMARY OF THE INVENTION

The present invention concerns an efficient method for adding one or more DASDs to a RAID array without disrupting ongoing operation of the array. In a first embodiment, after contents of one or more new DASDs are initialized, such as by pre-storing binary zeros, the "parity" or "data" status of specific storage locations in the array is re-mapped. This evenly distributes the parity tracks in the array, without any changes to the storage locations' contents. Distribution may be effected, for example, by dividing tracks of the array into intervals, and swapping a selected logical address within the interval with a logical address from the new DASD(s).

A second embodiment efficiently expands RAID arrays and further balances workload for existing data by re-mapping parity and data tracks, changing the contents of some tracks and maintaining the contents of others. In this embodiment, the new DASD is first initialized, such as by pre-storing binary zeros to the new DASD. Labels are then swapped between all storage locations of the new DASD and all existing parity tracks. Then, parity is selectively re-distributed through the new and existing DASDs, preferably using a round-robin distribution scheme. This involves swapping of contents as well as labels, thereby evenly distributing the existing data tracks throughout the array.

The invention affords its users with a number of distinct advantages. First, the invention provides an efficient means for expanding a RAID array with minimal disruption to ongoing host-access of the array. Accordingly, the invention supports increases in RAID storage capacity and parallelism, while avoiding or minimizing storage reorganization operations that may otherwise be time consuming and risky. In addition, the invention maintains a favorable data and parity distribution, without requiring any significant shifting of data and parity information within the RAID array.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Broadly, the present invention comprises a method of expanding an array, such as a RAID storage array, while maintaining balanced data and parity distribution and minimizing or eliminating the transfer or copying of previously stored information. This is accomplished by initializing the new disks' contents and re-designating the "parity" or "data" status of specific storage locations in the array while minimizing or completely avoiding any changes to the disks' contents.

STRUCTURE

Figure 2:
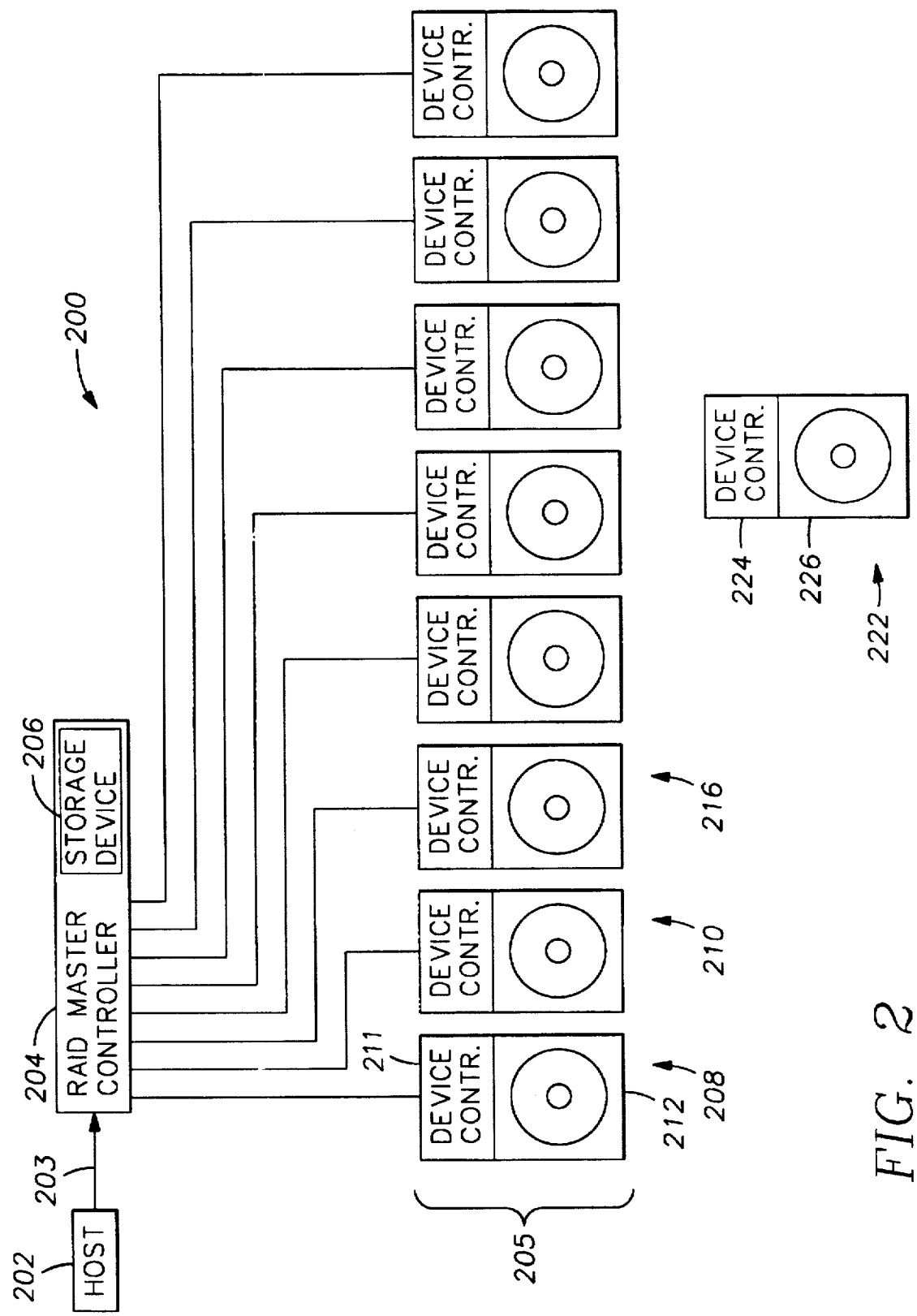
FIG. 2 is a diagram of the hardware environment of an array system to implement the invention.

The present invention may be implemented in a hardware environment such as the storage system 200 of FIG. 2. The system 200 includes a host 202, such as a mainframe or personal computer. A RAID master controller 204, electrically coupled to the host 202, manages operations of the RAID array 205. The RAID master controller 204, which may comprise a microprocessor, preferably includes a data storage device 206 to store mapping instructions and other information associated with the operation of the RAID array 205. The storage device 206 preferably comprises a non-volatile storage apparatus such as one or more magnetic data storage disks or an electrically programmable read-only memory (EPROM).

The master controller 204 includes an address input 203 for receiving logical storage addresses from the host 202. The controller 204 is programmed to access the physical storage locations of the RAID array 205 in response to the logical addresses identified by signals on the address input 203. More particularly, the controller 204 applies the mapping instructions stored in the device 206 to the logical address input signal to decode or translate the logical adress the signal, and identify an appropriate physical storage location in one of the units of the array 205.

The RAID array 205 includes multiple RAID units 208, 210, 216. As illustrated by the exemplary hardware environment of FIG. 2, each RAID unit preferably comprises a direct access storage device ("DASD") or another suitable data storage apparatus. Each of the RAID units or DASDs 208, 210, and 216 includes a device controller and one or more data storage media such magnetic disks, optical disks, and the like. For example, the RAID unit or DASD 208 includes a device controller 211 and the storage media 212. Preferably, the RAID array 205 is configured pursuant to the well known RAID-5 protocol.

A new DASD 222 is also shown, prior to inclusion into the RAID array 205. The DASD 222 includes a device controller 224 and the storage media 226.

OPERATION

Having described an exemplary hardware environment (FIG. 2) for the invention, FIGS. 3-6 are introduced to describe sequences for implementing various methods embodying the present invention. Generally, the method of the present invention serves to expand a RAID array while maintaining balanced data and parity distribution and minimizing or avoiding the need to transfer or copy previously stored information.

In one embodiment, the process of expanding the RAID array may be performed by the RAID master controller 204, by executing a series of computer-readable instructions contained on a data storage medium, such as a storage device 206. However, these instructions may instead be tangibly embodied on another DASD array (not shown), magnetic tape, magnetic floppy or rigid diskette, conventional "hard disk drive", electronic read-only memory, optical storage device, set of paper "punch" cards, or another data storage device.

First Embodiment

A first embodiment of the invention is chiefly used to efficiently expand RAID-5 arrays by re-mapping certain selected parity tracks without changing their contents. In this method, some of the parity tracks of the existing DASDs are re-mapped when new disks are added, but none of the existing data tracks is re-mapped. This effects a logical relocation of disk tracks without physically moving the data.

Figure 1:
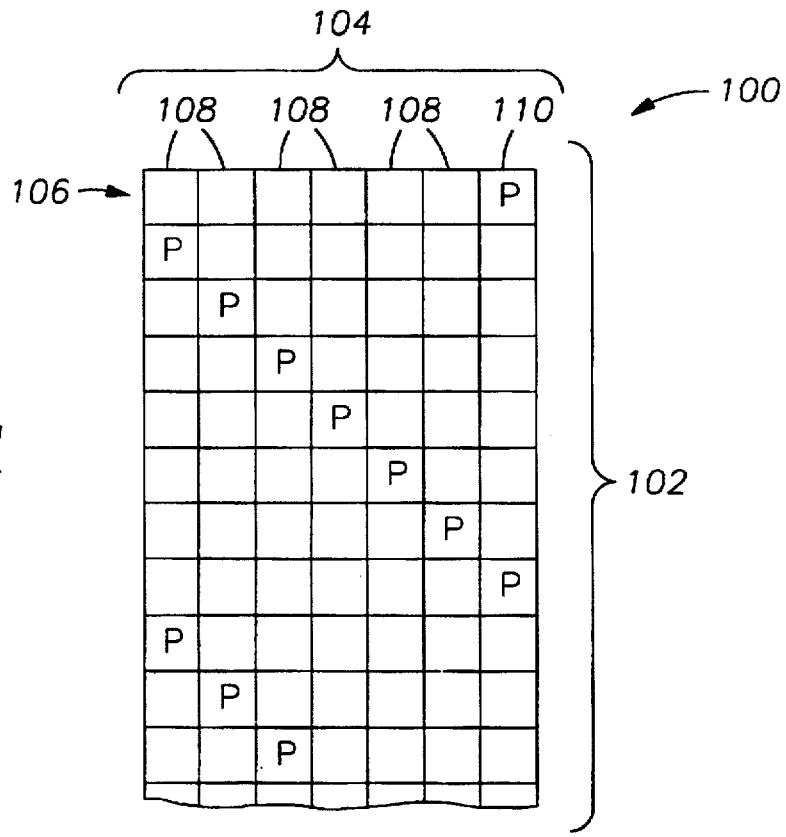
FIG. 1 is a storage allocation diagram of a prior art RAID-5 array.
Figure 3:
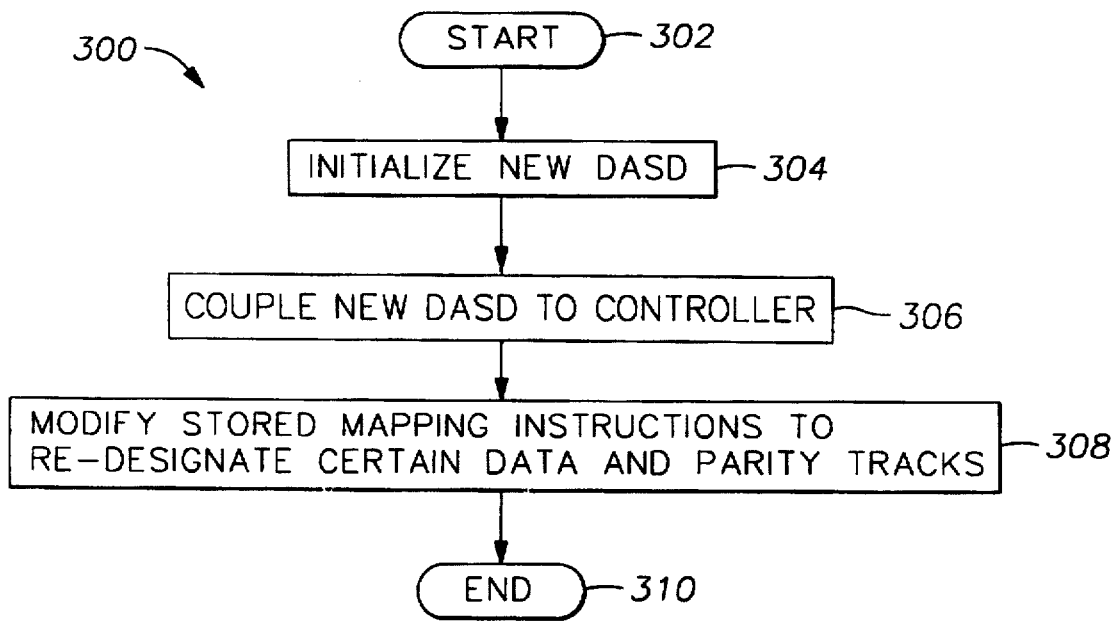
FIG. 3 is a flowchart illustrating a sequence to efficiently expand arrays without shifting storage contents, in accordance with a first embodiment of the invention.

The process 300 of FIG. 3 illustrates one way to carry out this method. The process 300 is performed each time one or more new DASDs are added to the RAID array, prior to placing the new DASDs on-line. For ease of illustration, the process 300 describes the addition of a single DASD 222 in the context of the hardware environment of FIG. 2.

After the process 300 is initiated in task 302, the new DASD 222 is initialized in task 304. Preferably, this initialization involves pre-storing binary zeros to the storage media 226 of the new DASD 222. Next, the new DASD 222 is electrically coupled to the controller 204 in task 306. Finally, in task 308 the mapping instructions stored in the storage device 206 are modified pursuant to the invention, to ensure even distribution of data and parity tracks. Alternatively, task 306 may be performed prior to task 304, thereby achieving the same effect. Furthermore, the RAID array may contain one or more "spare" DASDs, already coupled to the controller, where the spare DASDs are enabled to satisfy step 306.

Figure 4:
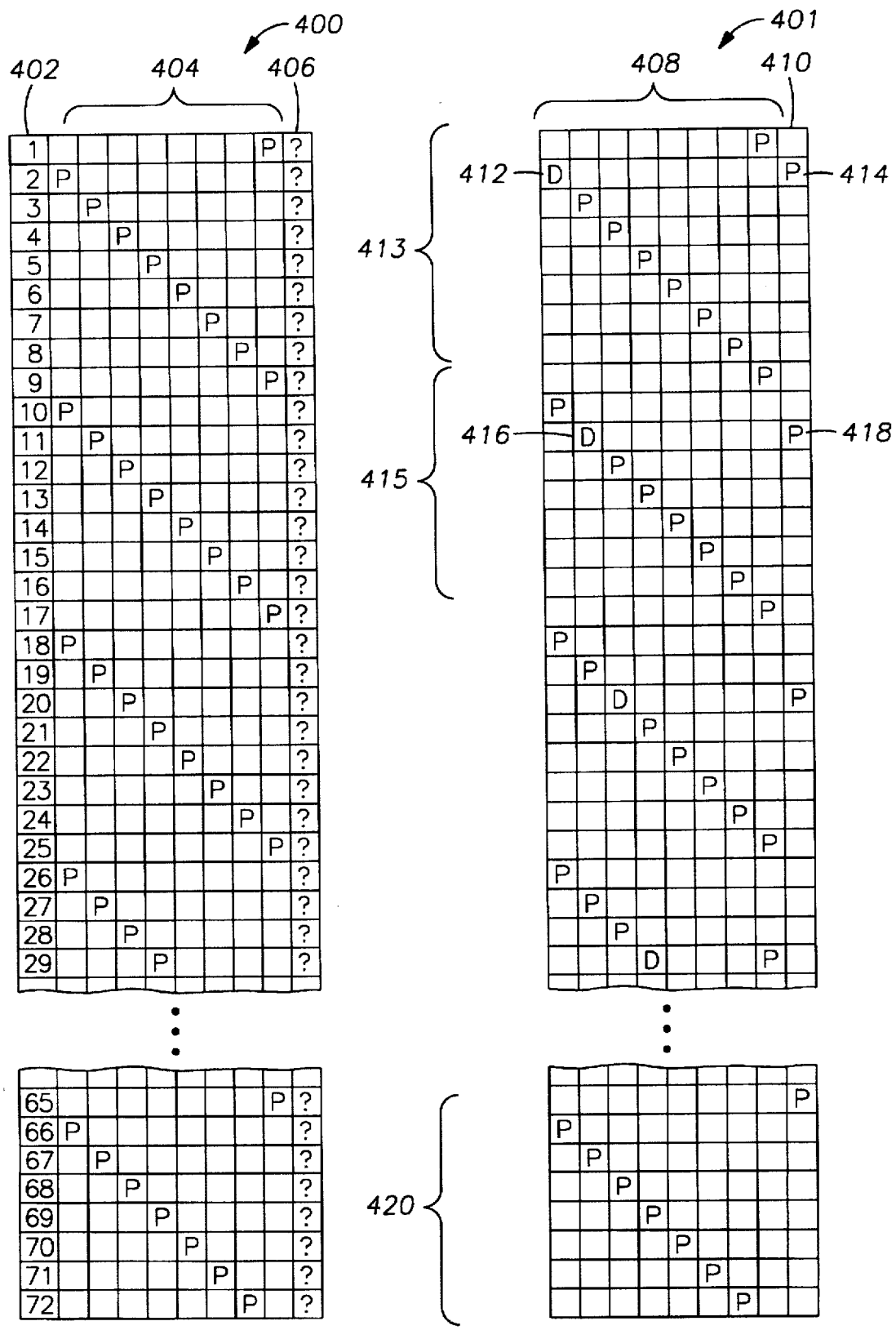
FIG. 4 is a diagram illustrating storage locations of an array before and after re-mapping pursuant to the first embodiment of the invention.

To illustrate step 308 in greater detail, FIG. 4 depicts a tabular representation 400 of the storage tracks of the RAID array 205 and the new DASD 222 prior to addition of the new DASD 222. FIG. 4 also depicts a table 401 representing the storage tacks of the RAID array 205 and the new DASD 222 after adding and reconfiguring the new DASD 222.

Each of the eight columns 404 corresponds to one of the DASDs of the array 205. Each DASD contains a number of ordered storage locations, where the "order" corresponds to track numbers shown in the column 402. For purposes of describing the invention, similarly ordered storage locations from all DASDs form a "row," each row representing the corresponding tracks of the DASDs of the array 205. The tracks making up a row, however, do not have to be physically positioned at the same ordered location on each disk.

Each storage location of the tables 400–401 has a unique address. As discussed in greater detail below, the stored mapping instructions maintain the relationship between these unique addresses and logical address input signals placed upon the input 203.

The table content of each DASD at a particular track is given by "P" if that location is designated (i.e., mapped) for parity storage, or shown empty or as "D" if designated for data storage. Data tracks and parity tracks, however, are physically indistinguishable, i.e., in their raw format stored on the DASDs; they are distinct only semantically, i.e., in their labeling and thus their usage. In FIG. 4, the eighth DASD contains the parity information for the first track; the other DASDs of this row contain data.

The column 406 represents the contents of the storage media 226 of the new DASD 222. Prior to adding the new DASD 222 to the array 205, the stored mapping instructions do not yet designate the new DASD's contents as parity or data; therefore, the column 406 contains a series of "?" entries.

To implement task 308 of FIG. 3, the stored mapping instructions are modified so that parity-designated tracks of certain DASDs are re-designated for data. In each of these tracks, the corresponding track of the new DASD 222 (column 406) is designated for storage of parity. All remaining tracks of the new DASD 222 (column 406) are designated for data storage.

This process does not change any of the stored contents (parity or data) of any DASD. The process re-maps the parity storage locations. Since the storage media 226 of the new DASD 222 are pre-stored with zeros, the DASD 222 can be added without affecting the existing parity computation. That is, the existing parities remain correct for the expanded RAID array.

A number of different methods may be used to decide which existing parity tracks should be swapped with the corresponding tracks of the new DASD 222 to balance the distribution of parity tracks across all DASDs. One exemplary method operates as follows. The tracks 402 are divided into intervals equal in number to the number of existing columns (DASDs) 404; in the present example, this number is eight. With this sizing, a parity track will only appear once in each DASD in a single interval.

Next, intervals are considered sequentially, with "round-robin" re-designation of parity tracks, described as follows. For each successive interval, successively increasing tracks are selected for "swapping" of parity and data designation. If in the first interval the second DASDs parity track is re-designated as "data", the corresponding track in the new DASD unit 222 (column 406) is then designated for parity.

Table 401 illustrates the re-mapped DASDs 408 and the newly added DASD 410. In the first interval 413, the track 412 has been designated data, and the corresponding track 414 has been designated parity.

Next, the second interval 415 is adjusted in the same way: the parity track of an existing DASD is located, and re-designated as data, as shown by 416. In the present example, this track comprises track 11 (see table 400) of the second DASD. Accordingly, the corresponding track 418 is designated for parity.

This process continues, advancing though the fourth, fifth, sixth DASDs, and so on. After processing the eighth DASD (the final existing DASD), the newly added DASD (i.e., the ninth DASD) is considered in the interval 420. However, the newly added DASD does not contain any parity in this interval 420 for possible swapping with an existing DASD. Therefore, no storage locations are re-designated. In other words, the newly added DASD does not receive any parity storage locations in the interval 420. After the interval 420, the next interval (not shown) is considered, starting with the first existing DASD.

After this re-mapping of parity tracks, one DASD in each interval does not contain any parity track. These parity-free track intervals are distributed evenly across the DASDs by the round-robin allocation. Consequently, through label-swapping, a portion of the parity tracks are therefore re-assigned to the new DASD. However, none of the existing data tracks need be re-assigned.

This scheme, then, is used to re-established the mapping instructions stored in the device 206. The storage capacity of the RAID array has thus been increased. Namely, the mapping instructions now reflect (1) newly available data tracks in the new DASD 222, as well as (2) the newly available tracks introduced by previous parity storage locations of the DASDs 404 that have been re-designated as data locations.

If another DASD is subsequently added to the array, the same re-mapping steps are performed again: assigning logical track numbers to the new DASD, then swapping parity and data designators as discussed above.

The re-mapping in task 308 may be performed simply by changing the mapping instructions stored in the device 206. In a preferred embodiment, the stored mapping instructions comprise a program of machine-readable instructions that convert an address signal received on the input 203 into an address to access a storage location in the RAID array, i.e. "forward mapping." Table 1 (below) provides a pseudo-code sequence embodying one example of such a program.

TABLE 1

Exemplary Forward Mapping Program

```
/*New logical-to-physical track mapping */
/* Given L*/
/* To compute K, T, and D(T,i) for i=0, . . . ,n-d-1*/
If (L<d*C) then Do                    /*L is an initial data track */
  T = FLOOR(L/d)
  K = ((L mod d) +T) mod n
End
Else Do                               /* L is an added data track */
  T = L mod C
  K = FLOOR(L/C)+n-d                  /* . . . might be swapped to
                                         another disk */
End
D(T,i) = T+d+i mod n, for i=0, . . . ,n-d-1 /* . . . might be swapped */
If (e>0) then Do j=0 to e-1           /* For each added disk, handle
                                         swapping */
  y=n+j                               /* . . . the added disk */
  x=FLOOR(T/n) mod y+1                /* . . . the disk selected for
                                         swapping */
  If (x=y) then iterate j             /* No swapping if added disk
                                         is selected */
  Do i = 0 to n-d-1
    If (D(T,i)=x) then Do             /* Selected disk is parity:
                                         swap label */
      If (K=y) then K=x
      D(T,i)=y
      Leave i
    End                               /* D()=x */
  End i
End j
Return
```

In the program of Table 1, the following variables and expressions are used:

L=a logical address, i.e. logical track number; for a data track in the DASD array;
  n=the original total number of DASDs;
  d=the original number of non-parity DASDs;
  e=the number of new DASDs;
  C=the capacity of each DASD, in number of tracks;
  K=a physical DASD number;
  T=a physical track number in a DASD;
  D(T,i)=the physical DASD number for the i-th parity for physical track T, where i is typically 0;
  A mod B→denotes the residue of A modulo B, which is an integer between 0 and (B−1) inclusively; and
  FLOOR (A/B)→denotes the integer quotient of A divided by B.

The numbering for L, K, and T all starts from 0. With these variables, a RAID-5 array may be used as a single, logical disk with d×C data tracks. The stored mapping instructions (e.g. the program of Table 1) therefore maps input addresses ("logical addresses") to storage locations in the RAID array ("physical addresses").

Advantageously, adding new DASDs to the array does not require any changes to the program of Table 1. The mapping program is modified simply by updating the variables "n" and "d". Table 2 contains a pseudo-code listing to illustrate an exemplary reverse mapping program corresponding to Table 1. In response to an actual address in the RAID array, the program of Table 2 provides the corresponding input address.

TABLE 2

Exemplary Reverse Mapping Program

```
/* New physical-to-logical track mapping */
/* Given K and T */
/* To compute L if it is a data track, or compute i if it is the i-th */
/* parity for track T */
If (K<n) then Do                      /* Case 1: K is an initial
                                         disk */
  z = K-T mod n
  If (z<d) then                       /* The track is an initial data
                                         track */
    Return "DATA", L=d*T+z
  Else Do                             /* The track was initially
                                         P(T,z-d) */
    If (e>0) then Do j=0 to e-1       /* Chk swapping for each
                                         added disk */
      y=n+j                           /* . . . the added disk */
      x=FLOOR(T/n) mod y+1            /* . . . the disk selected for
                                         swapping */
      If (K=x) then                   /* The track has been
                                         swapped */
        Return "DATA", L=(d+j)*C+T
      End j
      Return "PARITY", i=z-d          /* The track has not been
                                         swapped */
    End                               /* Else */
  End                                 /* k<n */
Else Do                               /* Case 2: K is an added
                                         disk */
  Flag=0                              /* "The track has not been
                                         swapped"*/
  L = (K-n+d)*C + T                   /* The initial label for the
                                         track */
  D(T,i) = T+d+i mod n, for i=0, . . . ,n-d-1 /* Initial parity tracks */
  Do j=0 to e-1                       /* Check swapping for each
                                         added disk */
    y=n+j                             /* . . . the added disk */
    x+FLOOR(T/n) mod y+1              /* . . . the disk selected for
                                         swapping */
    If (x=y) then iterate j           /* . . . No swapping if added
                                         dsk is selected */
    Do i = 0 to n-d-1
      If (D(T,i)=x) then Do           /* Selected disk is parity:
                                         swap label*/
        D(T,i)=y
        If (Flag=0)&(K=y) then Do
          Flag=1                      /* "The track has been
                                         swapped w/parity" */
      ParityNumber=i
    End
    If (Flag=1)&(K=x) then            /* It's been swapped again
                                         w/data */
      Return "DATA", L=(j+d)*C+T
      Leave i
```

Figure 5:
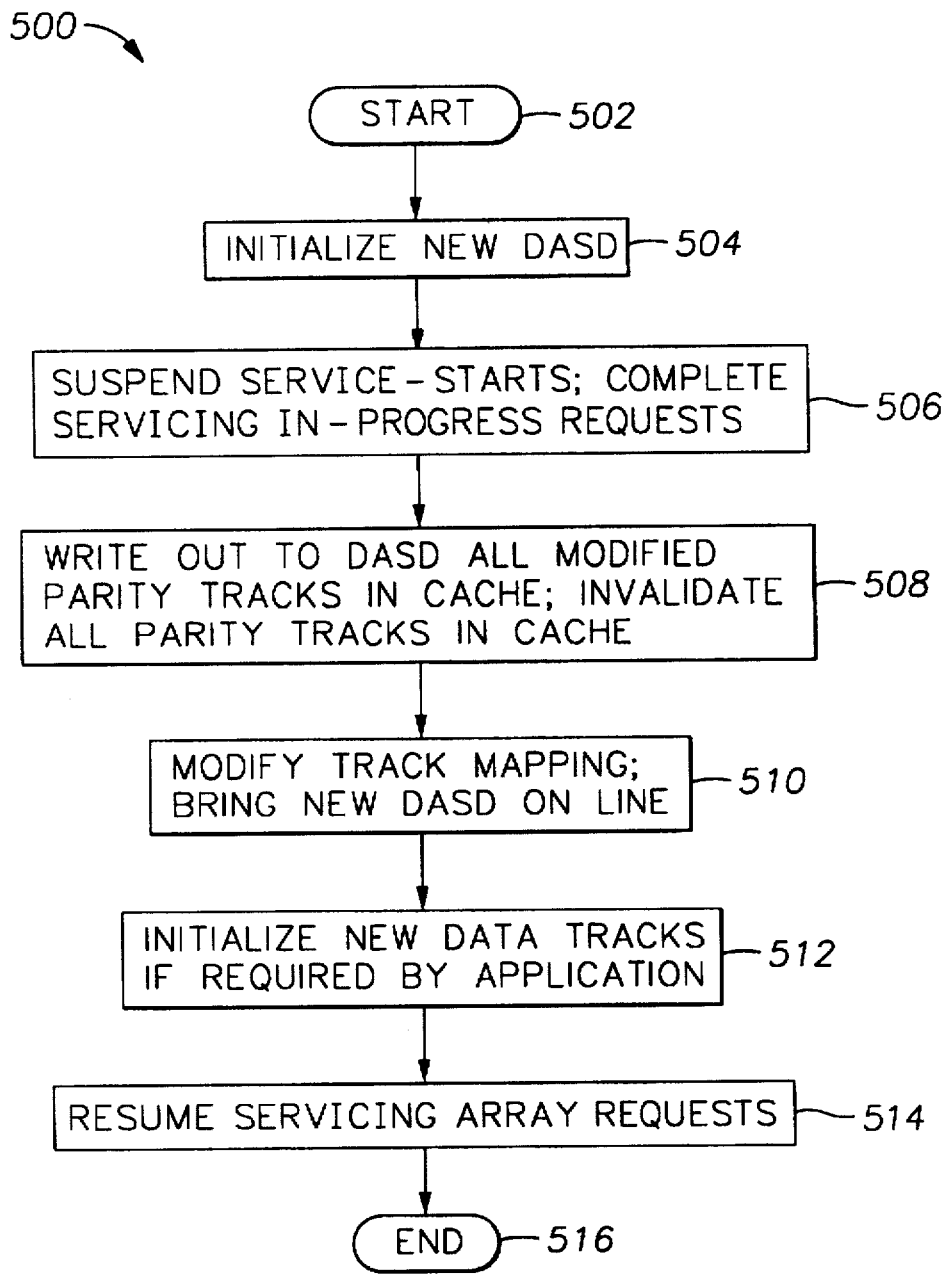
FIG. 5 is a more detailed flowchart illustrating a sequence of steps to efficiently expand arrays without shifting storage contents, in accordance with the first embodiment of the invention.

FIG. 5 depicts a detailed flowchart to illustrate specific steps that may be used to implement the first embodiment of the invention. After the routine 500 begins in task 502, the new DASD 222 is initialized, off-line, by filling the storage media 226 of the DASD 222 with binary zeros. Next, in task 506 the controller 204 suspends service-starts. New requests for access to the RAID array 205 may be queued or rejected. Also in task 506, the controller 204 also completes servicing all in-progress requests.

Then, in task 508 the controller 204 may perform various cache-related functions. This step is applicable if the controller 204 operates a cache memory (not shown) for expediting RAID array access. Particularly, the controller 204 writes out to the existing DASDs all modified parity tracks in the cache, and then invalidates all parity tracks in the cache.

In task 510, the controller 204 modifies the track mapping by implementing modified mapping instructions, as discussed above. This may be accomplished, as discussed previously, by modifying a mapping program to reflect an updated number of parity and data DASDs. After the mapping instructions are updated, the new DASD 222 is brought on-line, also in task 510.

In task 512, the controller 204 may (optionally) initialize the new data tracks with binary zeros, depending upon the particular application. This step may be omitted for most applications; if it is required, however, initialization need only be performed to those physical storage locations of the new DASD that were swapped with an existing DASD, and the corresponding parity tracks are adjusted accordingly. In task 514 the controller 204 resumes servicing array requests, and then the routine 500 ends in task 516.

Second Embodiment

The present invention also contemplates a second embodiment that efficiently expands RAID arrays by re-mapping parity and data tracks and also, changing the contents of certain tracks while maintaining the contents of others. This approach is therefore especially useful when seeking to expand a RAID array to increase parallelism. This approach requires some exchange of track contents, in addition to label swapping, to re-distribute existing data before any new tracks are consumed.

Figure 6:
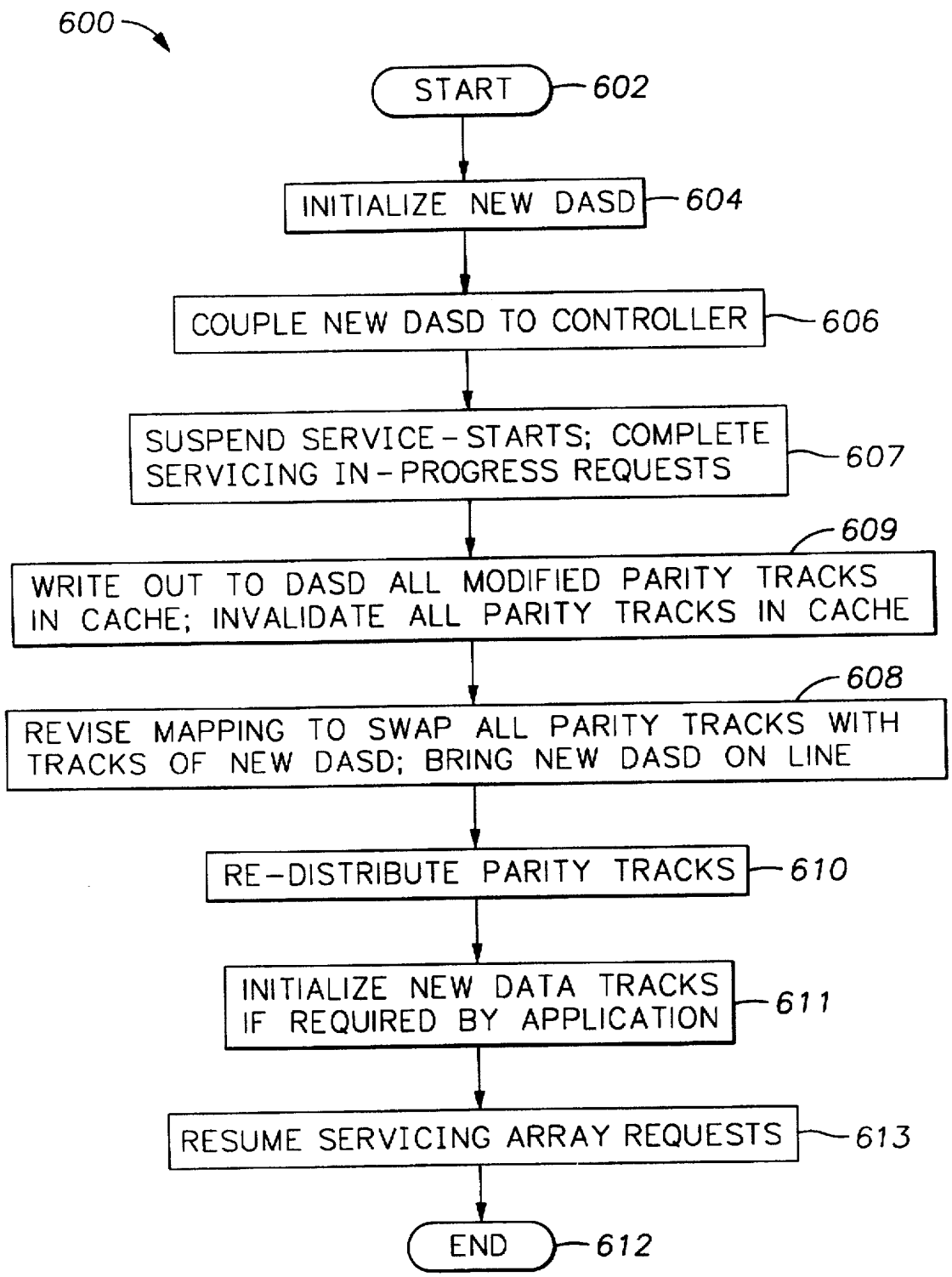
FIG. 6 is a flowchart illustrating a sequence of steps to efficiently expand arrays with minimal shifting of storage contents, in accordance with a second embodiment of the invention.

The process 600 of FIG. 6 generally illustrates one way to carry out this method. The process 600 is performed each time one or more new DASDs are added to the RAID array, prior to placing the new DASDs on-line. For ease of illustration, the process 600 describes the addition of a single DASD 222 in the context of the hardware environment of FIG. 2.

After the process 600 is initiated in task 602, the new DASD 222 is initialized in task 604. The initialization involves pre-storing binary zeros to the storage media 226 of the new DASD 222. Next, the new DASD 222 is electrically coupled to the controller 204 in task 606. Then, similar to tasks 506 and 508 in FIG. 5, the controller 204 performs tasks 607 and 609 to suspend service-starts, complete servicing in-progress requests, write out to DASD modified parity tracks in the cache, and invalidate parity tracks in the cache.

Next, in task 608 the mapping instructions stored in the storage device 206 are modified to swap labels between all existing parity tracks with the corresponding tracks of the new DASD 222. In other words, in task 608, all tracks in the storage media 226 of the new DASD 222 are labeled as parity tracks, and the previous parity tracks from the existing DASDs are re-labeled as data tracks.

Then, in task 610 the controller 204 re-distributes the parity tracks, to ensure even distribution of parity tracks among all DASDs. Task 610 is preferably performed to achieve a round-robin distribution of parity tracks, as discussed above. However, in contrast to the first embodiment described above, existing data is evenly distributed among all DASDs because all tracks of the new DASD were initially labeled "parity" and subsequently swapped in content and label with existing tracks. Even if the existing DASDs are partially empty, a certain amount of existing data is shifted into the new DASD.

Figure 7:
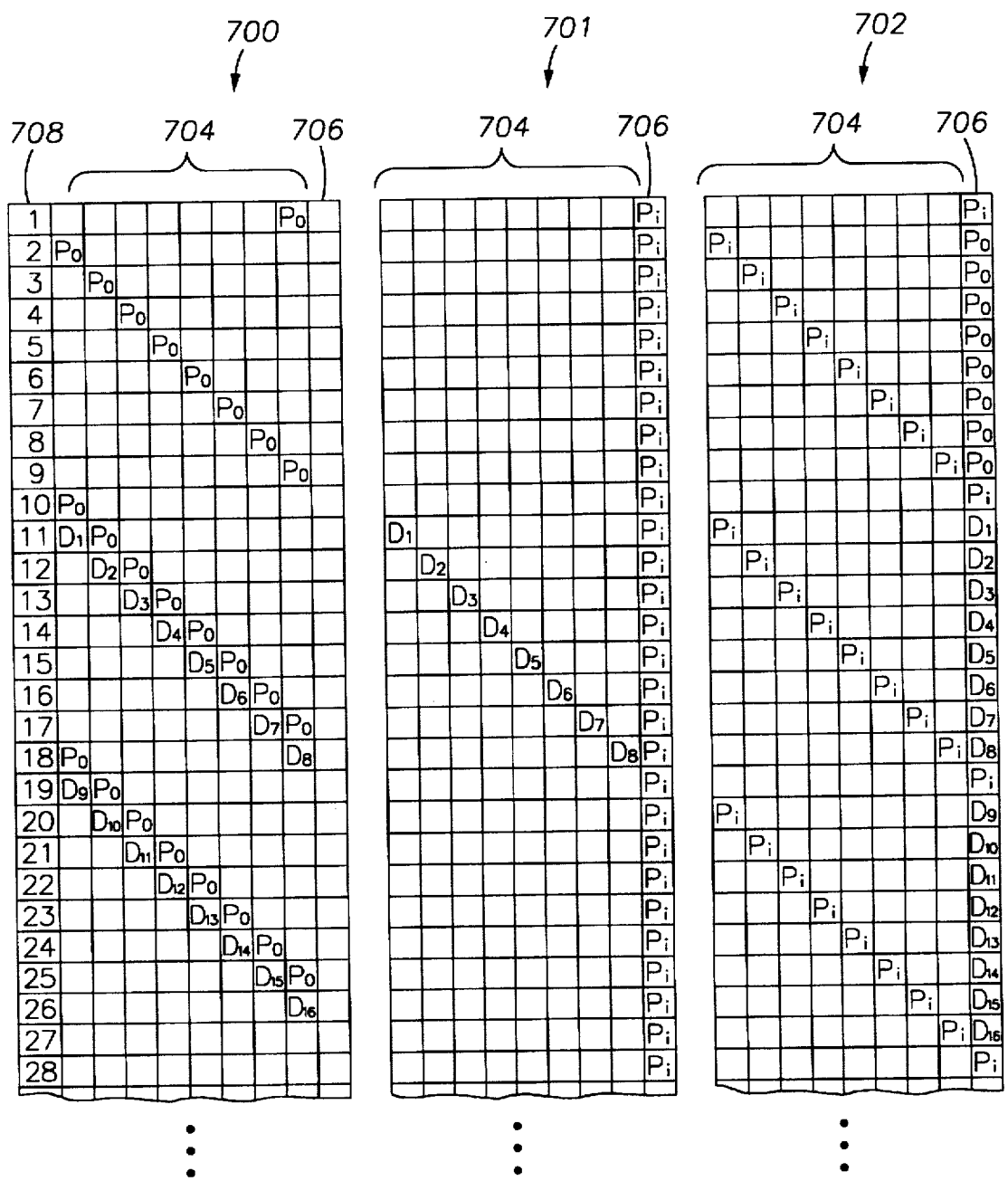
FIG. 7 is a diagram of tables illustrating storage locations of an array before and after re-mapping pursuant to the second embodiment of the invention.

To illustrate tasks 608, 610 in greater detail, FIG. 7 depicts tabular representations 700–702 of the storage tracks of the RAID array 205 and the new DASD 222 during various stages of the tasks 608, 610. More particularly, the table 700 depicts the existing and new DASDs prior to task 608. Each of the eight columns 704 corresponds to one of the existing DASDs of the array 205. The column 706 represents the storage tracks of the storage media 226 of the new DASD 222.

As in FIG. 4, each DASD contains a number of ordered storage locations, where the "order" corresponds to track numbers shown in the column 708. Similarly ordered tracks from all DASDs form a "row". The cell at a row and a column corresponds to a storage track of the RAID array 205.

The table 700 depicts the distribution of tracks originally mapped for parity storage, denoted by "$P_0$". Tracks shown as empty, or as "D", are mapped for data storage. Although the table 700 contains other data tracks, the data tracks $D_1$–$D_{16}$ depict certain tracks originally mapped for data storage.

After task 608 swaps mapping to designate all of the new DASD's tracks "parity" tracks, the state of the array is shown by the table 701. All tracks of the new DASD are mapped for "intermediate" parity storage, as shown by the "$P_i$" notations in column 706. The content of the tracks in the columns 704 formerly denoted $P_0$ remains the same, but these tracks are no longer designated for parity storage.

After task 608, task 610 re-distributes the intermediate parity tracks, shifting the contents of data and parity tracks where necessary. In particular, the locations for the parity tracks are preferably selected using a round-robin scheme. This scheme may be implemented by selecting a new location for a parity track, incrementing the track number and DASD number to select a next new parity track, and repeating these steps until the storage locations of the DASDs are exhausted. In the illustrated example, the initial parity tracks are shifted in content and label as shown by the table 702.

As a result, the new DASD (shown by the column 706 in the table 702) receives contents including a mix of the following: tracks originally designated in the columns 704 as parity tracks $P_0$ (now designated as data and shown in the column 706 as "$P_0$"), tracks originally designated in the column 706 as intermediate parity tracks $P_i$ (still designated as parity and shown as "$P_i$"), and tracks originally designated in the column 706 as data tracks $D_n$ (now designated in the column 706 as data and shown as "$D_x$").

After tasks 608 and 610, tasks 611 and 613 initialize the new DASD (if required by the application) and resume servicing array requests, similar to tasks 512 and 514 (FIG. 5). Following task 613, the routine 600 ends in task 612.

Figure 8:
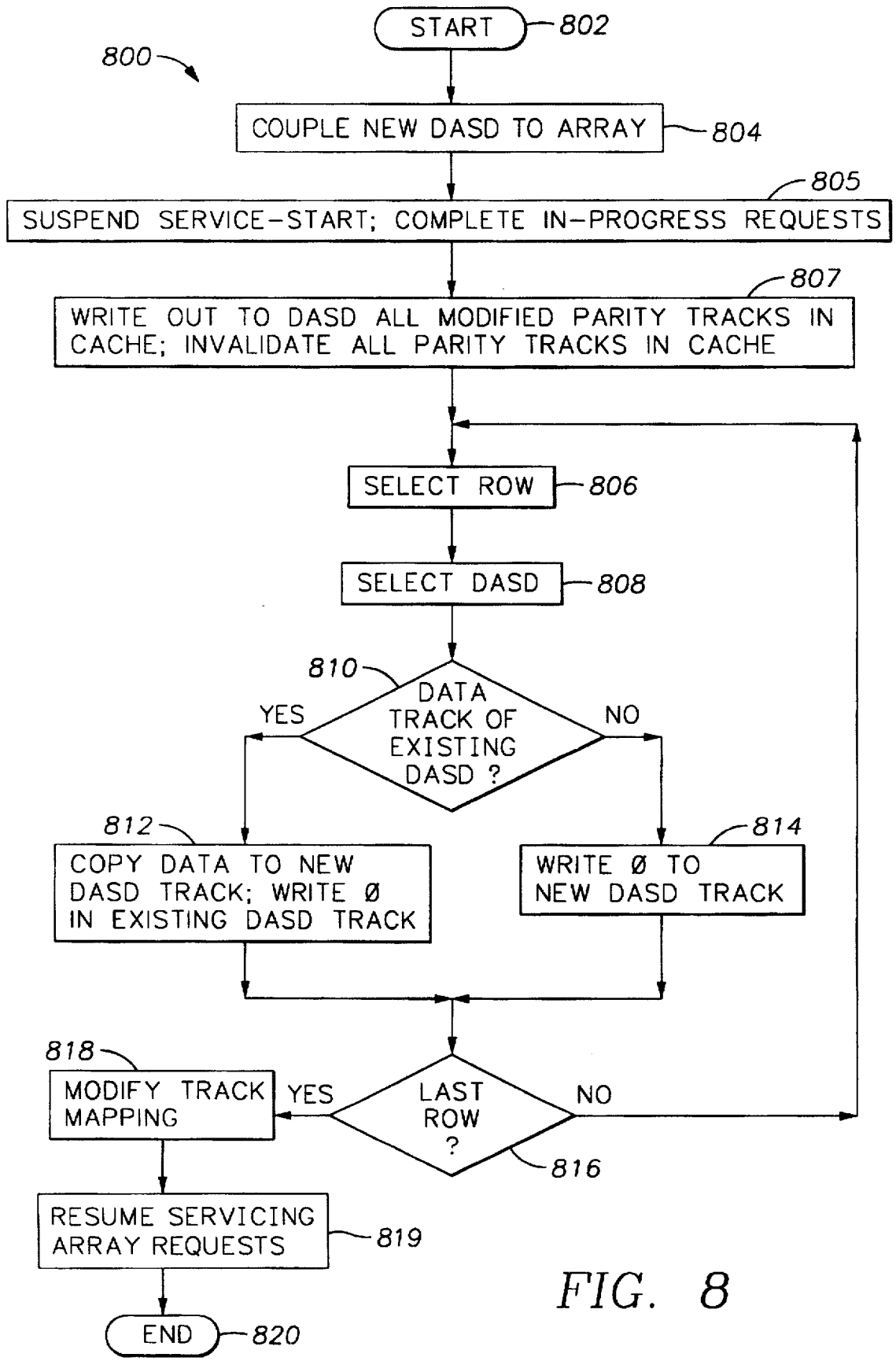
FIG. 8 is a flowchart illustrating in greater detail the re-distribution of parity tracks among DASDs of the array, in accordance with the invention.

In practice, the process 600 may be optimized by implementing several shortcuts, exemplified by the process 800 of FIG. 8. The process 800 serves to manage mapping and contents re-distribution of the existing DASDs, to ensure even distribution of data and parity with minimum READ/WRITE of DASD tracks. The process 800, like the process 600, may be executed by the controller 204.

After task 804 couples the new DASD to the array 205, tasks 805 and 807 are performed. Then tasks 806 and 808 advance through the storage tracks of the new and existing DASDs, selecting storage tracks for designation as the new parity tracks. Therefore, each time tasks 806 and 808 are performed, they identify a single storage track by selecting a track and a DASD. Tasks 806 and 808 may progress through the storage tracks in round-robin fashion, as mentioned above. In this case, each time tasks 806 and 808 are performed, they increment the track and DASD number by one.

Next, query 810 asks whether the selected storage track was a data track of an existing DASD. If so, task 812 copies the contents of this storage track to the storage track in the similar track of the new DASD, and stores binary zeros in the selected storage track. This step therefore exchanges the contents between the two storage tracks, as in the case of $D_1$ and $P_i$ in track 11 of tables 701–702.

If query 810 answers in the negative, task 814 writes binary zeros in the similar track of the new DASD, which may be designated either a parity track (such as the first row in table 702) or a new data track (such as the second row in table 702). No exchange of contents is mandated, since neither storage location contains any data.

After task 812 or 814, query 816 asks whether the last row has been processed. If not, control returns to tasks 806 and 808 to select another storage track. Otherwise, task 818 modifies the track mapping, which is followed by task 819 which resumes servicing access request. The process 800 ends in task 820.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

For example, as an alternative to the use of a program of machine-readable mapping instructions, the present invention may use a lookup-table or another stored array to map the storage locations of the RAID array.

Additionally, the methods described above may be optimized using a variety of different techniques, such as pruning, using pre-evaluated expressions, exploding the special case of a single parity disk, partial computation, and multiple-track computation.

Furthermore, a significant portion of the present discussion is made with reference to "tracks" of data for clarity of illustration. A "track", however, may also encompass a sector, block, set of tracks, a cylinder, or another suitable unit of storage.

What is claimed is:

1. A method for expanding a redundant array of inexpensive disks (RAID) system while maintaining a balanced data and parity distribution, where said system includes multiple original direct access storage devices (DASDs) coupled to a controller, each said original DASD including multiple storage units, wherein storage units from a plurality of DASD form a "row", and wherein the controller includes an address input and is programmed to access the storage units in response to addresses specified by address signals on the address input, wherein each storage unit corresponds to a unique address as determined by stored mapping instructions accessible by the controller that also designate contents of each storage unit as data or parity, wherein contents of one storage unit of each row is designated as parity, said method comprising the steps of:

initializing at least one new DASD;

coupling the at least one new DASD to the controller; and modifying the stored mapping instructions to designate storage units designated as parity of selected rows as data and to designate storage units of a selected one of the new DASDs in each of the selected rows as parity without physically changing the contents of any storage unit.

2. The method of claim 1, wherein the DASDs comprise magnetic storage devices.

3. The method of claim 1, wherein the DASDs comprise optical storage devices.

4. The method of claim 1, wherein the stored mapping instructions comprise a machine-readable list of storage units and their corresponding addresses.

5. The method of claim 1, further comprising the steps of suspending read/write operations from being performed upon the DASDs during the modifying step.

6. The method of claim 1, wherein the coupling step is performed prior to the initializing step.

7. The method of claim 1, wherein the DASDs embody a RAID-5 configuration.

8. The method of claim 1, wherein the selected rows are evenly distributed within each of the DASDs.

9. The method of claim 1, wherein the selected rows are chosen in accordance with a round-robin distribution scheme.

10. The method of claim 1, wherein the rows comprise physical rows.

11. The method of claim 1, wherein the rows comprise logical rows.

12. The method of claim 1, wherein each storage unit is ordered with respect to other storage units in the same DASD, and each row comprises similarly ordered storage units from all DASDs.

13. The method of claim 1, wherein the stored mapping instructions comprise a program of machine-readable instructions executable by the controller to identify storage units corresponding to addresses received at the address input.

14. The method of claim 13, wherein the modifying step comprises the step of storing a signal representative of a total number of the DASDs including the original DASDs and the new DASDs.

15. A method for expanding a redundant array of inexpensive disks (RAID) system while maintaining a balanced data and parity distribution, where said system includes multiple original direct access storage devices (DASDs) coupled to a controller, each said original DASD including multiple storage units, wherein storage units from a plurality of DASDs form a "row", and wherein the controller includes an address input and is programmed to access the storage units in response to addresses specified by address signals on the address input, wherein each storage unit corresponds to a unique address as determined by stored mapping instructions accessible by the controller that also designate contents of each storage unit as data or parity, wherein contents of one storage unit of each row is designated as parity, and said method comprising the steps of:

initializing the new DASD by storing binary zeros thereon;

coupling the new DASD to the controller;

modifying the stored mapping instructions to designate all storage units of the new DASD as parity and all storage units of original DASDs as data;

re-distributing parity storage locations from the new DASD to all DASDs including the new DASD by performing steps, for each particular row, comprising:

selecting a DASD, thereby defining a target storage location identified by the selected DASD and the particular row;

if the selected DASD is not the new DASD, exchanging the contents of the target storage location with the storage location of the new DASD in the particular row; and modifying the stored mapping instructions to designate the target storage location as parity and the new DASDs' storage location of the particular row as data.

16. The method of claim 15, wherein the DASDs comprise magnetic storage devices.

17. The method of claim 15, wherein the DASDs comprise optical storage devices.

18. The method of claim 15, wherein the stored mapping instructions comprise a program of machine-readable instructions executable by the controller to identify storage units corresponding to addresses received at the address input.

19. The method of claim 15, wherein the stored mapping instructions comprise a machine-readable list of storage units and their corresponding addresses.

20. The method of claim 15, further comprising the steps of suspending read/write operations from being performed upon the DASDs during the steps of modifying the stored mapping instructions and re-distributing parity storage locations.

21. The method of claim 15, wherein the coupling step is performed prior to the initializing step.

22. The method of claim 15, wherein the DASDs embody a RAID-5 configuration.

23. The method of claim 15, wherein the target storage locations are evenly distributed among the DASDs.

24. The method of claim 15, wherein the target storage locations are chosen in accordance with a round-robin distribution scheme.

25. The method of claim 15, wherein the rows comprise physical rows.

26. The method of claim 15, wherein the rows comprise logical rows.

27. The method of claim 15, wherein each storage unit is ordered with respect to other storage units in the same DASD, and each row comprises similarly ordered storage units from all DASDs.

28. A method for expanding a redundant array of inexpensive disks (RAID) system while maintaining a balanced data and parity distribution, where said system includes multiple original direct access storage devices (DASDs) coupled to a controller, each said original DASD including multiple ordered storage units, wherein similarly ordered storage units from all DASDs form a "row", and wherein the controller includes an address input and is programmed to access the storage units in response to addresses specified by address signals on the address input, wherein each storage unit corresponds to a unique address as determined by stored mapping instructions accessible by the controller that also designate contents of each storage unit as data or parity, wherein contents of one storage unit of each row is designated as parity, said method comprising the steps of:

coupling the new DASD to the controller;

initializing the new DASD by storing binary zeros thereon;

for each particular row:

selecting a DASD, thereby identifying a target storage location of the current row and selected DASD;

if the selected DASD is the new DASD, designating the target storage location as parity;

if the selected DASD is an original DASD and the target storage location was designated parity, designating the storage location of the new DASD at the particular row data;

if the selected DASD is an original DASD and the target storage location was designated data, copying contents of the target storage location to the storage location of the new DASD at the particular row and storing binary zeros to the target storage location and designating the target storage location parity and designating the storage location of the new DASD at the particular row data.

29. A method for expanding a redundant array of inexpensive disks (RAID) system while maintaining a balanced data and parity distribution, where said system includes multiple original direct access storage devices (DASDs) coupled to a controller, each said original DASD including multiple ordered storage units, wherein similarly ordered storage units from all DASDs form a "row", and wherein the controller includes an address input and is programmed to access the storage units in response to addresses specified by address signals on the address input, wherein each storage unit corresponds to a unique address as determined by stored mapping instructions accessible by the controller that also designate contents of each storage unit as data or parity, wherein contents of one storage unit of each row is designated as parity, said method comprising the steps of:

coupling the new DASD to the controller;

for each row:

selecting a DASD, thereby identifying a target storage location of the current row and selected DASD;

if the selected DASD is the new DASD, storing binary zeros to the target storage location and designating the target storage location parity;

if the selected DASD is an original DASD and the target storage location was designated parity, designating the storage location of the new DASD at the current row data and storing binary zeros to the new DASD's storage location at the current row; and if the selected DASD is an original DASD and the target storage location was designated data, copying contents of the target storage location to the storage location of the new DASD at the current row and designating the target storage location parity and designating the storage location of the new DASD at the current row data and storing binary zeros to the target storage location.

30. A data storage device, tangibly embodying a program of machine-readable instructions executable by a computer to perform method steps for expanding a redundant array of inexpensive disks (RAID) system while maintaining a balanced data and parity distribution, where said system includes multiple original direct access storage devices (DASDs) coupled to a controller, each said original DASD including multiple storage units, wherein storage units from a plurality of DASD form a "row", and wherein the controller includes an address input and is programmed to access the storage units in response to addresses specified by address signals on the address input, wherein each storage unit corresponds to a unique address as determined by stored mapping instructions accessible by the controller that also designate contents of each storage unit as data or parity, wherein contents of one storage unit of each row is designated as parity, said method steps comprising:

initializing at least one new DASD;

coupling the at least one new DASD to the controller; and modifying the stored mapping instructions to designate storage units designated as parity of selected rows as data and to designate storage units of a selected one of the new DASDs in each of the selected rows as parity without physically changing the contents of any storage unit.

31. The data storage device of claim 30, wherein the DASDs comprise magnetic storage devices.

32. The data storage device of claim 30, wherein the DASDs comprise optical storage devices.

33. The data storage device of claim 30, wherein the stored mapping instructions comprise a machine-readable list of storage units and their corresponding addresses.

34. The data storage device of claim 30, further comprising the steps of suspending read/write operations from being performed upon the DASDs during the modifying step.

35. The data storage device of claim 30, wherein the coupling step is performed prior to the initializing step.

36. The data storage device of claim 30, wherein the DASDs embody a RAID-5 configuration.

37. The data storage device of claim 30, wherein the selected rows are evenly distributed within each of the DASDs.

38. The data storage device of claim 30, wherein the selected rows are chosen in accordance with a round-robin distribution scheme.

39. The data storage device of claim 30, wherein the rows comprise physical rows.

40. The data storage device of claim 30, wherein the rows comprise logical rows.

41. The data storage device of claim 30, wherein each storage unit is ordered with respect to other storage units in the same DASD, and each row comprises similarly ordered storage units from all DASDs.

42. The data storage device of claim 30, wherein the stored mapping instructions comprise a program of machine-readable instructions executable by the controller to identify storage units corresponding to addresses received at the address input.

43. The data storage device of claim 42, wherein the modifying step comprises the step of storing a signal representative of a total number of the DASDs including the original DASDs and the new DASDs.

44. A data storage device, tangibly embodying a program of machine-readable instructions executable by a computer to perform method steps for expanding a redundant array of inexpensive disks (RAID) system while maintaining a balanced data and parity distribution, where said system includes multiple original direct access storage devices (DASDs) coupled to a controller, each said original DASD including multiple storage units, wherein storage units from a plurality of DASDs form a "row", and wherein the controller includes an address input and is programmed to access the storage units in response to addresses specified by address signals on the address input, wherein each storage unit corresponds to a unique address as determined by stored mapping instructions accessible by the controller that also designate contents of each storage unit as data or parity, wherein contents of one storage unit of each row is designated as parity, said method steps comprising:

initializing the new DASD by storing binary zeros thereon;

coupling the new DASD to the controller;

modifying the stored mapping instructions to designate all storage units of the new DASD as parity and all storage units of original DASDs as data;

re-distributing parity storage locations from the new DASD to all DASDs including the new DASD by performing steps, for each particular row, comprising:

selecting a DASD, thereby defining a target storage location identified by the selected DASD and particular row;

if the selected DASD is not the new DASD, exchanging the contents of the target storage location with the storage location of the new DASD in the particular row; and modifying the stored mapping instructions to designate the target storage location as parity and the new DASDs' storage location of the particular row as data.

45. The data storage device of claim 44, wherein the DASDs comprise magnetic storage devices.

46. The data storage device of claim 44, wherein the DASDs comprise optical storage devices.

47. The data storage device of claim 44, wherein the stored mapping instructions comprise a program of machine-readable instructions executable by the controller to identify storage units corresponding to addresses received at the address input.

48. The data storage device of claim 44, wherein the stored mapping instructions comprise a machine-readable list of storage units and their corresponding addresses.

49. The data storage device of claim 44, further comprising the steps of suspending read/write operations from being performed upon the DASDs during the exchanging steps of modifying the stored mapping instructions and re-distributing parity storage locations.

50. The data storage device of claim 44, wherein the coupling step is performed prior to the initializing step.

51. The data storage device of claim 44, wherein the DASDs embody a RAID-5 configuration.

52. The data storage device of claim 44, wherein the target storage locations are evenly distributed among the DASDs.

53. The data storage device of claim 44, wherein the target storage locations are chosen in accordance with a round-robin distribution scheme.

54. The data storage device of claim 44, wherein the rows comprise physical rows.

55. The data storage device of claim 44, wherein the rows comprise logical rows.

56. The data storage device of claim 44, wherein each storage unit is ordered with respect to other storage units in the same DASD, and each row comprises similarly ordered storage units from all DASDs.

57. A data storage device, tangibly embodying a program of machine-readable instructions executable by a computer to perform method steps for expanding a redundant array of inexpensive disks (RAID) system while maintaining a balanced data and parity distribution, where said system includes multiple original direct access storage devices (DASDs) coupled to a controller, each said original DASD including multiple ordered storage units, wherein similarly ordered storage units from all DASDs form a "row", and wherein the controller includes an address input and is programmed to access the storage units in response to addresses specified by address signals on the address input, wherein each storage unit corresponds to a unique address as determined by stored mapping instructions accessible by the controller that also designate contents of each storage unit as data or parity, wherein contents of one storage unit of each row is designated as parity, said method steps comprising:

coupling the new DASD to the controller;

initializing the new DASD by storing binary zeros thereon;

for each particular row:

selecting a DASD, thereby identifying a target storage location of the particular row and selected DASD;

if the selected DASD is the new DASD, designating the target storage location parity;

if the selected DASD is an original DASD and the target storage location was designated parity, designating the storage location of the new DASD at the particular row data;

if the selected DASD is an original DASD and the target storage location was designated data, copying contents of the target storage location to the storage location of the new DASD at the particular row and storing binary zeros to the target storage location and designating the target storage location parity and designating the storage location of the new DASD at the current row data.

58. A data storage device, tangibly embodying a program of machine-readable instructions executable by a computer to perform method steps for expanding a redundant array of inexpensive disks (RAID) system while maintaining a balanced data and parity distribution, where said system includes multiple original direct access storage devices (DASDs) coupled to a controller, each said original DASD including multiple ordered storage units, wherein similarly ordered storage units from all DASDs form a "row", and wherein the controller includes an address input and is programmed to access the storage units in response to addresses specified by address signals on the address input, wherein each storage unit corresponds to a unique address as determined by stored mapping instructions accessible by the controller that also designate contents of each storage unit as data or parity, wherein contents of one storage unit of each row is designated as parity, said method steps comprising:

coupling the new DASD to the controller;

for each row:

selecting a DASD, thereby identifying a target storage location of the current row and selected DASD;

if the selected DASD is the new DASD, storing binary zeros to the target storage location and designating the target storage location parity;

if the selected DASD is an original DASD and the target storage location was designated parity, designating the storage location of the new DASD at the current row data and storing a binary zero to the new DASD's storage location at the current row; and if the selected DASD is an original DASD and the target storage location was designated data prior to the designating step, copying contents of the target storage location to the storage location of the new DASD at the current row and designating the target storage location parity and designating the storage location of the new DASD at the current row data and storing a binary zero to the target storage location.

* * * * *